(12) United States Patent
Lee

(10) Patent No.: US 7,043,279 B2
(45) Date of Patent: May 9, 2006

(54) HANDSFREE STRUCTURE WITH ANTIBACKGROUND NOISE FUNCTION

(76) Inventor: Ching-Chuan Lee, No.9, Lane 50, Sec. 3, Muhsin Road, Taipei (TW)

( * ) Notice: Subject to any disclaimer, the term of this patent is extended or adjusted under 35 U.S.C. 154(b) by 519 days.

(21) Appl. No.: 10/336,894

(22) Filed: Jan. 7, 2003

(65) Prior Publication Data

US 2004/0198462 A1 Oct. 7, 2004

(30) Foreign Application Priority Data

Dec. 3, 2002 (CN) .............................. 02 2 84984

(51) Int. Cl.
*H04M 1/00* (2006.01)

(52) U.S. Cl. .................. 455/569.1; 455/575.1; 455/90.3; 455/550.1; 381/151; 381/326; 381/355

(58) Field of Classification Search ............ 455/550.1, 455/575.1–575.2, 575.6, 569.1, 569.2, 570, 455/90.3; 379/433.02, 433.03; 381/151, 381/326, 190, 380, 355
See application file for complete search history.

(56) References Cited

U.S. PATENT DOCUMENTS

| | | | |
|---|---|---|---|
| 2,773,941 A * | 12/1956 | Christiansen | 381/151 |
| 2,832,842 A * | 4/1958 | Knauert | 381/326 |
| 4,901,354 A * | 2/1990 | Gollmar et al. | 381/380 |
| 5,673,328 A * | 9/1997 | Wandl et al. | 381/151 |
| 5,757,935 A * | 5/1998 | Kang et al. | 381/326 |
| 6,483,917 B1 * | 11/2002 | Kang et al. | 379/433.02 |
| 6,519,345 B1 * | 2/2003 | Yang | 381/151 |
| 6,724,908 B1 * | 4/2004 | Fukuyama | 381/396 |
| 2002/0110252 A1 * | 8/2002 | Liu | 381/355 |

* cited by examiner

*Primary Examiner*—Lana Le
(74) *Attorney, Agent, or Firm*—Law Offices of John Chupa & Associates, P.C.

(57) ABSTRACT

A handsfree structure with antibackground noise function, comprising: a male plug, coupled to an output of a mobilephone; a voice receiving device, coupled to said male plug by a wire for picking up a voice signal of a user; a reaction type voice receiving device, coupled to said male plug by said wire for picking up said voice signal of said user by sensing the vibration of skin of said user; and a earphone set, coupled to said male plug by said wire for transformation a electric signal received from said mobilephone into a voice signal; while said mobilephone receiving a call, said user could switch said handsfree structure from said voice receiving device to said reaction type voice receiving device or from said reaction type voice receiving device to said voice receiving device according to a background noise of the environment for getting more clear voice signal so as to improve the communication quality of a high background noise environment.

5 Claims, 2 Drawing Sheets

HANDSFREE STRUCTURE WITH ANTIBACKGROUND NOISE FUNCTION

FIELD OF THE INVENTION

The present invention relates generally to the field of handsfree structure of a mobilephone and, more particularly, to handsfree structure with antibackground noise function for improving the communication quality of the mobilephone.

BACKGROUND OF THE INVENTION

Generally speaking, user could attach a handsfree structure to a mobilephone for the purpose of preventing electromagnetic radiation or safety of driving. The handsfree structure of prior art only provides a traditional microphone for transmission the voice signal of the user via air. But the microphone also transmits the background noise at the same time. Therefore, the handsfree structure with traditional microphone of prior art could work well in low background noise environment. However, the handsfree structure of prior art could not work well in high background noise environment and it's communication quality is so bad.

As a result, an improved handsfree structure with antibackground noise function that reduces background noise transmitted and improves the communication quality is needed.

SUMMARY OF THE INVENTION

It is an object of the present invention to provide a handsfree structure with antibackground noise function, wherein a user could switch said handsfree structure from said voice receiving device to said reaction type voice receiving device or from said reaction type voice receiving device to said voice receiving device according to a background noise of the environment for getting more clear voice signal so as to improve the communication quality of a high background noise environment.

In accordance with one embodiment of the invention, a handsfree structure with antibackground noise function is provided comprising: a male plug, coupled to an output of a mobilephone; a voice receiving device, coupled to said male plug by a wire for picking up a voice signal of a user; a reaction type voice receiving device, coupled to said male plug by said wire for picking up said voice signal of said user by sensing the vibration of skin of said user; and a earphone set, coupled to said male plug by said wire for transformation a electric signal received from said mobilephone into a voice signal; while said mobilephone receiving a call, said user could switch said handsfree structure from said voice receiving device to said reaction type voice receiving device or from said reaction type voice receiving device to said voice receiving device according to a background noise of the environment for getting more clear voice signal so as to improve the communication quality of a high background noise environment.

BRIEF DESCRIPTION OF THE DRAWINGS

The novel features believed characteristic of the invention are set forth with particularity in the appended claims. The invention itself, however, as well as a preferred mode of use, further objectives and advantages thereof, will be best understood by reference to the following detailed description when read in conjunction with the accompanying drawings, wherein:

DETAILED DESCRIPTION OF THE PREFERRED EMBODIMENTS

Figure 1:
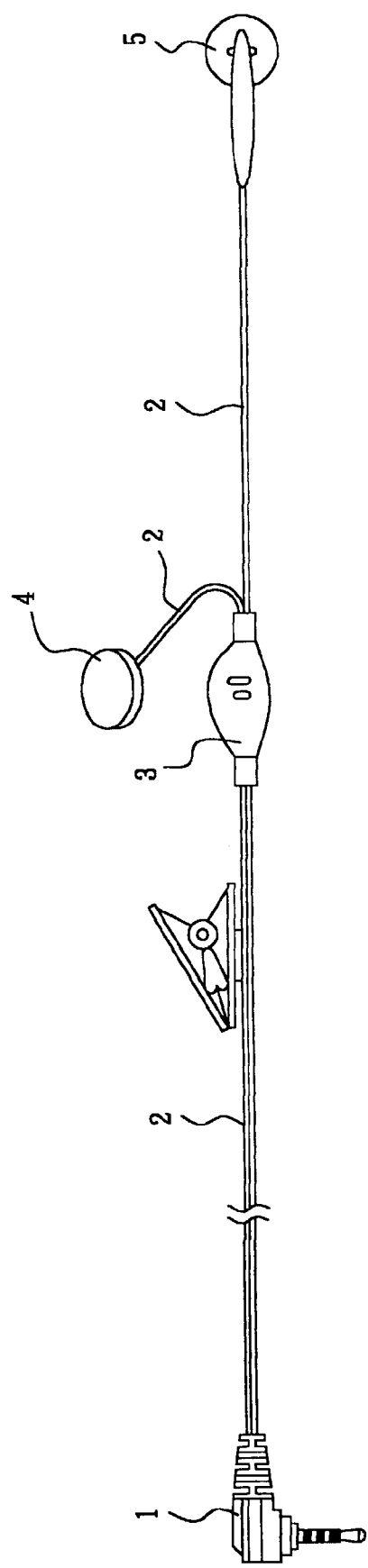
FIG. 1 depicts an assembly view of a handsfree structure with antibackground noise function in accordance with one embodiment of the present invention.

Referring first to FIG. 1, there is an assembly view of a handsfree structure with antibackground noise function in accordance with one embodiment of the present invention. The handsfree structure with antibackground noise function comprises: a male plug 1; a voice receiving device 3; a reaction type voice receiving device 4; and an earphone set 5.

Wherein, the male plug 1 is coupled to an output of a mobilephone (not shown); the voice receiving device 3 is coupled to the male plug 1 by a wire 2 for picking up a voice signal of a user (not shown), wherein the voice receiving device 3 is a microphone preferably; the reaction type voice receiving device 4 is coupled to the male plug 1 by the wire 2 and could attach to the skin of the user tightly for sensing the vibration of the skin so as to pick up the voice signal; the earphone set 5 is coupled to the male plug 1 by the wire 2 for transformation a electric signal received from the mobilephone into a voice signal. While the mobilephone receiving a call, the user could switch the handsfree structure from the voice receiving device 3 to the reaction type voice receiving device 4 or from the reaction type voice receiving device 4 to the voice receiving device 3 according to a background noise of the environment for getting more clear voice signal so as to improve the communication quality of a high background noise environment.

Figure 2:
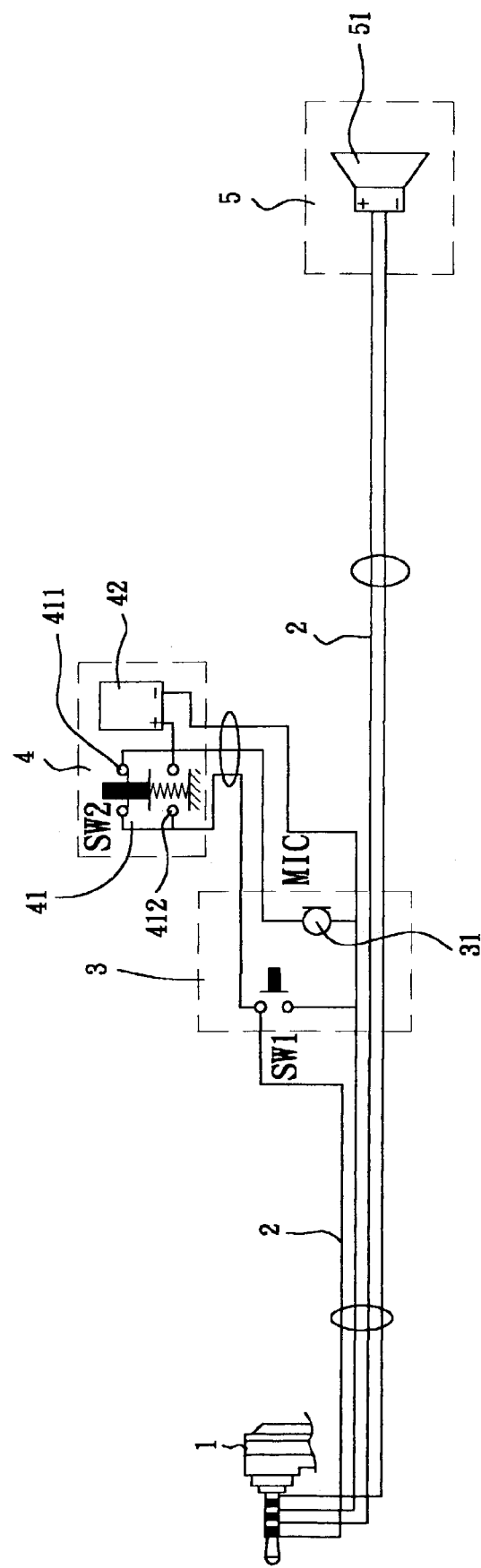
FIG. 2 depicts a circuit diagram of the handsfree structure with antibackground noise function in accordance with one embodiment of the present invention.

Referring to FIG. 2 is a circuit diagram of the handsfree structure with antibackground noise function in accordance with one embodiment of the present invention. As shown in FIG. 2, the voice receiving device 3 further comprises a microphone 31 for picking up the voice signal of the user. The reaction type voice receiving device 4 further comprise a switch 41 coupled to the male plug 1 by the wire 2, wherein the switch 41 comprises a first pair of contacts 411 that are at a close circuit state normally, and a second pair of contacts 412 that are at a open circuit state normally, upon pressing the switch 41, the first pair of contacts 412 are become an open circuit state and the second pair contacts are become a close circuit state, such that the voice signal could transfer to the male plug 1 via the close loop constructed of the wire 2, the first pair of contacts 411 and the microphone 31; and a sensor 42, coupled to the switch 41 and could attach to the skin of the user tightly for sensing the vibration of the skin so as to pick up the voice signal, wherein the sensor 42 could transfer voice signal into electric signal by sensing the vibration of the skin of the user, the sensor 42 for example could be piezoelectricity type microphone, capacitance type microphone, crystal type microphone, dynamic coil type microphone or liquid type microphone. While in a high background noise environment, the user could press the switch 41 to active the sensor 42, such that the voice signal could transfer to the male plug 1 via the close loop constructed of the wire 2, the second pair of contacts 412 and the sensor 42 to improve the communication quality of the high background noise environment. Wherein the earphone set 5 further comprises a speaker 51 for transferring the electric signal into the voice signal.

The description of the present invention has been presented for the purposes of illustration and description, but is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as suited to the particular use contemplated. While the invention has been described with reference to a preferred embodiment thereof, it is to be understood that modifications or variations may be easily made without departing from the spirit of this invention, which is defined by the appended claims.

What is claimed is:

1. A hands free structure with antibackground noise function, comprising:
    a male plug having a shape which allows said plug to be selectively and removably coupled to the output of a mobilephone;
    a voice receiving device which is deployed within a first housing and which is coupled to the male plug by a first flexible wire;
    an earphone which is coupled to said voice receiving device by a second flexible wire, wherein each of said first and second wires have a respective axis of symmetry and wherein said axes of symmetry are aligned;
    a reaction voice receiving device which is deployed within a second housing which is separate and distinct from said first housing and which is coupled to said first housing by a third flexible wire, thereby allowing the user to selectively and independently position both the reaction type voice receiving device and voice receiving device in separate and distinct selective locations upon a user so that each of said devices may be selectively deployed at an user location that substantially optimizes the respective performance of each of said devices;
    a switch assembly that is operatively deployed within said first housing and wherein said switch assembly selectively allows only one said reaction voice device and said voice receiving device to be operatively coupled to said earphone; and
    a clip which is deployed only between said male plug and said first housing, wherein said clip cooperates with said first, second, and third flexible wires to allow said hands free structure to be deployed in substantially any desired manner upon a user.

2. The hands free structure with antibackground noise function of claim 1, wherein said wire 3 forms an acute angle with said axes of symmetry of said wires one and two.

3. The hands free structure with antibackground noise function of claim 1, wherein the reaction type voice receiving device is comprised of a sensor for attaching to a user's skin and sensing the vibrations of the user's skin when the user speaks.

4. The hands free structure with antibackground noise function of claim 3, wherein said sensor for sensing the user's skin vibrations when the user speaks is comprised of one of the following types of microphones; a piezoelectricity type microphone, a capacitance type microphone, a crystal type of microphone, a dynamic coil type of microphone, or a liquid type microphone.

5. The hands free structure with antibackground noise function of claim 1, wherein said switch is comprised of a first pair of contacts and a second pair of contacts, which are respectively in a open and closed state, and which change there respective states when the switch is pressed.

* * * * *